UNITED STATES PATENT OFFICE.

JOHN McCLOSKEY AND CHARLES F. FARWELL, OF BOSTON, MASSACHUSETTS.

PRINTING-INK.

SPECIFICATION forming part of Letters Patent No. 422,430, dated March 4, 1890.

Application filed August 12, 1889. Serial No. 320,522. (No specimens.)

*To all whom it may concern:*

Be it known that we, JOHN MCCLOSKEY and CHARLES F. FARWELL, both of Boston, in the county of Suffolk and State of Massachusetts, have invented a new and useful Composition of Matter for Ink for Printing on Celluloid and other Pyroxyline Compounds, of which the following is a specification.

It is customary at the present time in making inks for printing on celluloid or other pyroxyline compounds to use a solvent for pyroxyline, in order that the ink may penetrate into the stock—*i. e.*, the celluloid or pyroxyline surface which is non-porous or non-absorbent—the object being to prevent the ink from being easily rubbed off from the surface of the stock.

Our invention has for its object the production of an ink which will retain its position upon the stock—*i. e.*, the celluloid or pyroxyline surface—without the employment of any solvent in compounding it.

The composition consists of the following ingredients, viz: the pigment, albumen, (animal or vegetable,) and glycerine, preferably diluted with water.

In practice we first select the desired pigment, preferably in powdered form, and add to it albumen, either vegetable, such as is derived from wheat-flour, or animal, preferably in the form of white of egg, and mix to a stiff paste. Then we add diluted glycerine in the proportion of, say, one part glycerine to ten parts water, and mix until the desired consistency is produced. This consistency varies with the size of the plate, (the ink being especially adapted for printing from engraved plates,) it being less for a large than for a smaller plate. The proportions of the ingredients vary considerably, according to the pigments employed. A fair statement of the proportions in bulk required for a black ink would be: pigment, twelve parts; albumen, twelve parts; diluted glycerine, one part. The albumen, however, varies considerably from the above. For a mineral ink it might not be more than five or six parts, while with lamp-black it might be fourteen or fifteen parts.

The albumen in the compound serves as a binder to unite or bind together the particles of pigment, so that when heat is applied the albumen coagulates and the ink is baked to a hard dry mass, leaving it elastic and capable of withstanding considerable friction—a necessary quality, as no solvent for pyroxyline is employed. The impression needs no extra drying to dry the print.

In order to increase the binding properties of the albumen, we may add gum-resin in powdered form—such as copal, mastic, shellac, &c.—the proportion varying from three parts to one-fourth of a part, according to the size of the plate.

Having thus fully described our invention, what we claim, and desire to secure by Letters Patent, is—

1. The herein-described composition of matter for ink for printing upon celluloid or other pyroxyline compounds, consisting, essentially, of pigment, albumen, (animal or vegetable,) and glycerine suitably diluted, substantially as specified.

2. The herein-described compound for ink for printing upon celluloid or other pyroxyline compounds, consisting of pigment, albumen, (animal or vegetable,) glycerine suitably diluted, and a gum-resin, substantially as specified.

JOHN McCLOSKEY.
CHARLES F. FARWELL.

Witnesses:
HENRY W. WILLIAMS,
C. J. PIERCE.